(12) United States Patent
Döring et al.

(10) Patent No.: US 9,803,575 B2
(45) Date of Patent: Oct. 31, 2017

(54) METHOD FOR OPERATING AN INTERNAL COMBUSTION ENGINE

(71) Applicant: MAN Diesel & Turbo SE, Augsburg (DE)

(72) Inventors: Andreas Döring, Muechen/Unterhaching (DE); Markus Bauer, Augsburg (DE)

(73) Assignee: MAN Diesel & Turbo SE, Augsburg (DE)

( * ) Notice: Subject to any disclaimer, the term of this patent is extended or adjusted under 35 U.S.C. 154(b) by 0 days.

(21) Appl. No.: 14/908,602

(22) PCT Filed: Jul. 28, 2014

(86) PCT No.: PCT/EP2014/066196
§ 371 (c)(1),
(2) Date: Jan. 29, 2016

(87) PCT Pub. No.: WO2015/014805
PCT Pub. Date: Feb. 5, 2015

(65) Prior Publication Data
US 2016/0160774 A1    Jun. 9, 2016

(30) Foreign Application Priority Data

Jul. 29, 2013 (DE) .......... 10 2013 012 566

(51) Int. Cl.
F02D 41/02    (2006.01)
F02D 41/14    (2006.01)
(Continued)

(52) U.S. Cl.
CPC ......... F02D 41/0235 (2013.01); F01N 3/208 (2013.01); F01N 9/00 (2013.01);
(Continued)

(58) Field of Classification Search
CPC .... F01N 3/208; F01N 11/007; F01N 2550/02; F01N 2610/02; F02D 41/0235
See application file for complete search history.

(56) References Cited

U.S. PATENT DOCUMENTS 5,937,639 A    8/1999 Sasaki et al.
6,968,679 B2   11/2005 Pott
(Continued)

FOREIGN PATENT DOCUMENTS

DE    102005049655    4/2007
DE    10 2008 005 640 A1    7/2009
(Continued)

*Primary Examiner* — Patrick Maines
(74) *Attorney, Agent, or Firm* — Cozen O'Connor

(57) ABSTRACT

A method for operating an internal combustion engine having a motor and an exhaust gas aftertreatment system having an exhaust gas aftertreatment component, wherein exhaust gas formed in the motor during combustion of fuel is guided via the exhaust gas aftertreatment system for cleaning, includes: determining an exhaust gas actual value that depends upon an actual value of a nitrogen dioxide fraction in the exhaust gas upstream of the exhaust gas aftertreatment component; and changing at least one operating parameter for the motor such that the actual value of the nitrogen dioxide fraction is brought closer to a corresponding reference value for the nitrogen dioxide fraction.

9 Claims, 1 Drawing Sheet

(51) Int. Cl.
*F01N 3/20* (2006.01)
*F01N 9/00* (2006.01)
*F01N 11/00* (2006.01)
*F02D 41/00* (2006.01)

(52) U.S. Cl.
CPC ........ *F01N 11/007* (2013.01); *F02D 41/1461* (2013.01); *F01N 2430/00* (2013.01); *F01N 2550/02* (2013.01); *F01N 2560/026* (2013.01); *F01N 2610/02* (2013.01); *F02D 41/0027* (2013.01); *F02D 2250/36* (2013.01); *Y02T 10/24* (2013.01); *Y02T 10/47* (2013.01)

(56) References Cited

U.S. PATENT DOCUMENTS

| | | |
|---|---|---|
| 8,191,413 B2 | 6/2012 | Lahr et al. |
| 2004/0040284 A1 | 3/2004 | Upadhyay et al. |
| 2004/0045278 A1* | 3/2004 | Pott .................... F02D 37/00 60/274 |
| 2006/0107649 A1 | 5/2006 | Kamikawa et al. |
| 2007/0089406 A1* | 4/2007 | Doring .................... F01N 3/106 60/295 |
| 2008/0276604 A1* | 11/2008 | Hosaka ................ F01N 3/0231 60/295 |
| 2009/0035194 A1 | 2/2009 | Robel et al. |
| 2010/0101218 A1 | 4/2010 | Gabe et al. |
| 2010/0293925 A1* | 11/2010 | Lahr ................... G01N 33/0024 60/276 |
| 2011/0000190 A1 | 1/2011 | Svensson et al. |
| 2012/0036842 A1 | 2/2012 | Nakamura |
| 2012/0055138 A1* | 3/2012 | Sloane ............... B01D 53/9495 60/274 |
| 2012/0060476 A1 | 3/2012 | Pfister |
| 2012/0285139 A1* | 11/2012 | Geyer ................... F01N 3/0885 60/274 |
| 2015/0316004 A1* | 11/2015 | Balthes ................ F01N 3/0231 60/274 |

FOREIGN PATENT DOCUMENTS

| | | | | |
|---|---|---|---|---|
| DE | 102010040678 | | 3/2012 | |
| DE | 102011111023 | | 3/2012 | |
| DE | 10 2010 050 406 A1 | | 5/2012 | |
| DE | 102013220666 A1 | * | 12/2014 | ............. F02M 26/15 |
| EP | 177384 A1 | | 4/2007 | |
| JP | 11-36923 | | 2/1999 | |
| JP | 2002-47923 | | 2/2002 | |
| JP | 2004-92557 | | 3/2004 | |
| JP | 2009-007948 | | 1/2009 | |
| JP | 2011-511897 | | 4/2011 | |
| JP | 2012-031787 | | 2/2012 | |
| JP | 2012-036837 | | 2/2012 | |
| JP | 2012-167549 | | 9/2012 | |
| WO | WO 02/073019 A2 | | 9/2002 | |
| WO | WO 2004/018850 | | 3/2004 | |
| WO | WO 2010/125659 | | 11/2010 | |

\* cited by examiner

METHOD FOR OPERATING AN INTERNAL COMBUSTION ENGINE

CROSS-REFERENCE TO RELATED APPLICATIONS

This is a U.S. national stage of application No. PCT/EP2014/066196, filed on 28 Jul. 2014, which claims priority to the German Application No. 10 2013 012 566.9, filed 29 Jul. 2013, the content of both incorporated herein by reference.

BACKGROUND OF THE INVENTION

1. Field of the Invention

The invention is directed to a method for the operation of an internal combustion engine.

2. Description of the Related Art

In addition to a motor, known internal combustion engines also have an exhaust gas aftertreatment system so that exhaust gas formed in the motor of the internal combustion engine during the combustion of fuel can be cleaned in the exhaust gas aftertreatment system. An efficient exhaust gas aftertreatment is required in order to meet increasingly strict exhaust gas limits.

In addition to solid particles, nitrogen oxides (NOx) in the exhaust gas must comply with increasingly strict limits. The nitrogen oxides in the exhaust gas are reduced using catalysts, for example, using selective catalytic reduction (SCR) catalysts. These SCR catalysts utilize ammonia as reductant for converting nitrogen oxides. The ammonia can be generated in an ammonia generator and introduced into the exhaust gas stream. In contrast, it is also possible to introduce an ammonia precursor substance, e.g., an aqueous urea solution, into the exhaust gas stream, which is then converted in the exhaust gas stream to ammonia, carbon dioxide and water vapor. The conversion of the ammonia precursor substance to ammonia in the exhaust gas is typically carried out using a hydrolysis catalyst.

The conversion of nitrogen oxides in the SCR catalytic converter is carried out when nitrogen monoxide exclusively is present in the exhaust gas as expressed by the following equation:

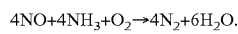
$$4NO+4NH_3+O_2 \rightarrow 4N_2+6H_2O.$$

The conversion of nitrogen monoxide in a SCR catalytic converter according to the equation given above takes place relatively gradually. Therefore, in order to accelerate the conversion of nitrogen oxides in the exhaust gas it is already known from practice to position an NO oxidation catalytic converter, particularly a platinum-containing NO oxidation catalytic converter, upstream of the SCR catalytic converter to convert nitrogen monoxide into nitrogen dioxide upstream of the SCR catalytic converter. In this case, when nitrogen dioxide is also present in the exhaust gas in addition to nitrogen monoxide, the conversion of the nitrogen oxides in the catalytic converter takes place according to the following equation:

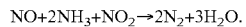
$$NO+2NH_3+NO_2 \rightarrow 2N_2+3H_2O.$$

The conversion of nitrogen oxides according to the formula cited above in the presence of nitrogen monoxide and nitrogen dioxide in the SCR catalytic converter takes place faster than the pure conversion of nitrogen monoxide in the SCR catalytic converter.

Accordingly, the rapidity of the conversion of nitrogen oxides contained in the exhaust gas in the SCR catalytic converter depends on the proportion of nitrogen dioxide in the exhaust gas. However, the use of a separate NO oxidation catalytic converter for converting the nitrogen monoxide into nitrogen dioxide upstream of a SCR catalytic converter is disadvantageous because this increases expenditure on apparatus and, therefore, the costs for an internal combustion engine.

SUMMARY OF THE INVENTION

Based on the foregoing disadvantages of the prior art, an object to of the present invention is to provide novel method for the operation of an internal combustion engine.

According to one aspect of the invention, an exhaust gas actual value is determined depending on the actual value of a nitrogen dioxide fraction in the exhaust gas upstream of an exhaust gas aftertreatment component of the exhaust gas aftertreatment system, wherein at least one operating parameter for the motor is changed such that the actual value of the nitrogen dioxide fraction is brought closer to a corresponding reference value of the nitrogen dioxide fraction so that the respective exhaust gas aftertreatment component is operated in an optimized manner.

The present invention proposes for the first time to adjust the nitrogen dioxide fraction in the exhaust gas upstream of an exhaust gas aftertreatment component of an exhaust gas aftertreatment system in a defined manner by changing at least one operating parameter for the motor of an internal combustion engine so that the exhaust gas aftertreatment component can be operated in an optimized manner. This makes it possible either to use smaller NO oxidation catalytic converters or to dispense with the use of NO oxidation catalytic converters completely.

The reference value for the nitrogen dioxide fraction is preferably selected as a function of load point. In particular, the reference value for the nitrogen dioxide fraction is determined depending on at least one operating parameter of the motor and/or depending on at least one operating parameter of the exhaust gas aftertreatment system. The use of a load point-dependent or operating point-dependent reference value for the nitrogen dioxide fraction in the exhaust gas is particularly preferred because in this way an optimal operation of the motor on the one hand and an optimal operation of the exhaust gas aftertreatment system of the internal combustion engine on the other hand can be ensured for all load points or operating points of the internal combustion engine.

According to an advantageous further development, a lambda value and/or an ignition time and/or valve control times and/or a motor compression and/or an exhaust gas proportion in the motor combustion chamber are/is changed in this way as operating parameter(s) for the motor. The nitrogen dioxide fraction in the exhaust gas can be adjusted in a simple and reliable manner via at least one of the above-mentioned operating parameters for the motor.

According to an advantageous further development, a NOx actual value is measured as an exhaust gas actual value downstream of the exhaust gas aftertreatment component of the exhaust gas aftertreatment system by a NOx sensor, the actual value of the nitrogen dioxide fraction in the exhaust gas is determined upstream of the exhaust gas aftertreatment component depending on this exhaust gas actual value, this actual value of the nitrogen dioxide fraction is compared with the reference value of the nitrogen dioxide fraction, and at least one operating parameter for the motor is changed depending on this comparison such that the actual value of the nitrogen dioxide fraction is brought closer to the reference value of the nitrogen dioxide fraction. This arrangement is particularly preferred because the NOx actual value downstream of the exhaust gas aftertreatment component can be measured in a simple manner by a NOx sensor. Based on this NOx actual value that can be detected by measuring techniques, the actual value of the nitrogen dioxide fraction in the exhaust gas can be deduced so that at least one operating parameter of the motor can then be changed depending on a comparison between the actual value of the nitrogen dioxide fraction and the reference value of the nitrogen dioxide fraction such that the actual value of the nitrogen dioxide fraction approaches the reference value.

Operating parameters for the motor are preferably changed such that raw NOx emissions of the motor are reduced by a maximum 15%. In this way, it is possible to operate the motor with good efficiency and to prevent an increase in fuel consumption.

BRIEF DESCRIPTION OF THE DRAWINGS

Preferred further developments of the invention are indicated in the following description. Embodiment examples of the invention are described more fully with reference to the drawings without the invention being limited to these embodiment examples. In the drawings.

DETAILED DESCRIPTION OF THE PREFERRED EMBODIMENTS

The invention is directed to a method for operating an internal combustion engine.

Figure 1:
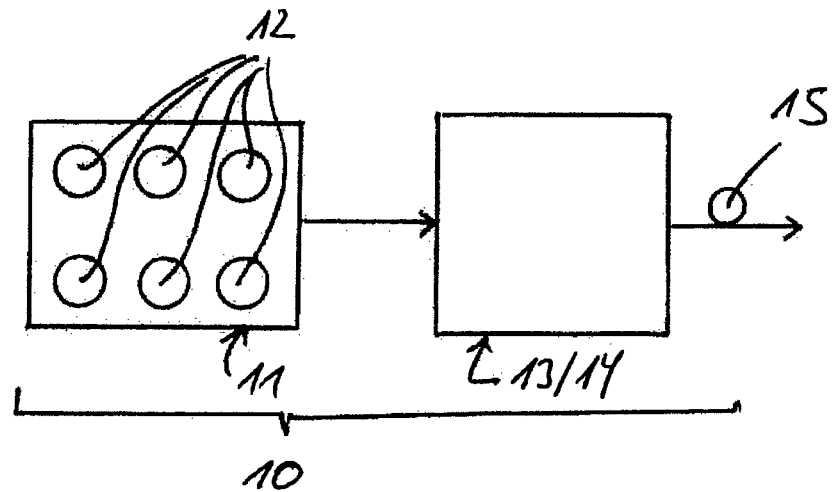
FIG. 1 is a schematic view of an internal combustion engine.

In a highly schematic manner, FIG. 1 shows an internal combustion engine 10 comprising a motor 11 with a plurality of cylinders 12 and an exhaust gas aftertreatment system 13 with at least one exhaust gas aftertreatment component 14. Exhaust gas formed during the combustion of fuel in the cylinders 12 of the motor 11 of the internal combustion engine 10 can be guided via the exhaust gas aftertreatment system 13 to clean the exhaust gas in the exhaust gas aftertreatment system 13. Positioned downstream of the exhaust gas aftertreatment system 13 according to FIG. 1 there is a sensor 15, which can be a NOx sensor in order to measure NOx emissions in the exhaust gas downstream of the exhaust gas aftertreatment system 13. The exhaust gas aftertreatment component 14 of the exhaust gas aftertreatment system 13 can be a SCR catalytic converter, a particle filter or a NOx storage catalytic converter.

For operating an internal combustion engine 10 of this type, an exhaust gas actual value is determined within the meaning of the invention, which exhaust gas actual value depends on the actual value of a nitrogen dioxide fraction in the exhaust gas upstream of the exhaust gas aftertreatment component 14 of the exhaust gas aftertreatment system 13. Depending on this exhaust gas actual value, at least one operating parameter for the motor 11 is changed such that the actual value of the nitrogen dioxide fraction is brought closer to a corresponding reference value for the nitrogen dioxide fraction so that the respective exhaust gas aftertreatment component 14 of the exhaust gas aftertreatment system 13 can be operated in an optimized manner.

Accordingly, it lies within the scope of the present invention to selectively influence the nitrogen dioxide fraction in the exhaust gas by changing at least one operating parameter of the motor 11 so that an exhaust gas aftertreatment component 14 of an exhaust gas aftertreatment system 13 located downstream of the motor 11 can be optimally operated.

The invention is used particularly in internal combustion engines 10 whose motor 11 is constructed as an Otto gas motor in which gaseous fuel is burned. Natural gas, which contains methane as constituent, is typically burned as gaseous fuel in Otto gas motors of this type.

The reference value for the nitrogen dioxide fraction in the exhaust gas is selected depending on the load point. Accordingly, it is possible to determine the reference value for the nitrogen dioxide fraction in the exhaust gas as a function of at least one operating parameter of the motor 11 and/or as a function of at least one operating parameter of the exhaust gas aftertreatment system 13. Thus it is possible to determine the reference value for the nitrogen dioxide fraction in the exhaust gas depending on one or more exhaust gas temperatures and depending on the efficiency of the exhaust gas aftertreatment system 13 and depending on the efficiency of the motor 11.

Preferably, a lambda value and/or an ignition time and/or valve control times and/or a motor compression and/or an exhaust gas proportion in the motor combustion chamber are/is changed in this way as operating parameter(s) for the motor.

When the lambda value is reduced, the nitrogen dioxide fraction in the exhaust gas tends to increase.

Further, by shifting the ignition time in direction of earlier ignition times and/or by increasing the proportion of exhaust gas in the motor combustion chamber, the nitrogen dioxide fraction in the exhaust gas tends to increase.

Further, it is possible to increase the nitrogen dioxide fraction in the exhaust gas by delayed opening of inlet valves of the cylinders 12 and by delayed closing of outlet valves of the cylinders 12.

By increasing the motor compression, the nitrogen dioxide fraction in the exhaust gas tends to decrease.

Figure 2:
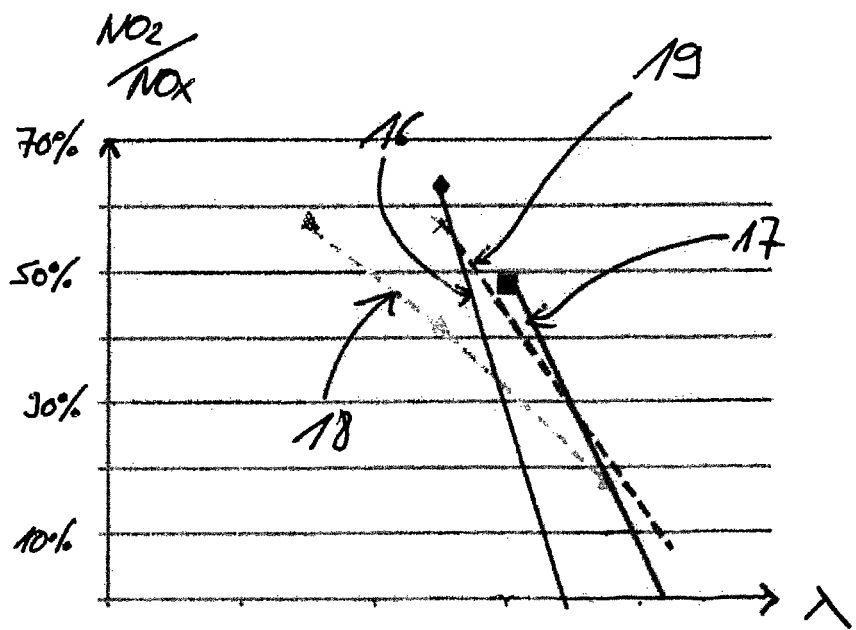
FIG. 2 is a diagram illustrating the invention.

The relationships mentioned above for influencing the nitrogen dioxide fraction in the exhaust gas are described by way of example for some operating parameters referring to FIG. 2. In FIG. 2, the percentage of nitrogen dioxide $NO_2$ in the nitrogen oxides NOx of the exhaust gas is plotted over the lambda value for a gas Otto motor, namely, depending on the load point of the motor 11 and depending on ignition times of the motor 11.

Characteristic lines 16 and 17 relate to characteristic lines for full load operation of the motor 11. In characteristic line 16, ignition times are late-shifted, and in characteristic line 17 ignition times are early-shifted.

Characteristic lines 18 and 19 relate to characteristic lines for partial load operation of the motor 11. In characteristic line 18, ignition times are late-shifted, and in characteristic line 19 ignition times are early-shifted.

In a particularly preferred variant of the invention, an NOx actual value is measured as an exhaust gas actual value by the NOx sensor 15 shown in FIG. 1 downstream of the exhaust gas aftertreatment component 14 of the exhaust gas aftertreatment system 13 that is to be operated in an optimized manner. Depending on this exhaust gas actual value, the actual value of the nitrogen dioxide fraction in the exhaust gas upstream of the exhaust gas aftertreatment component 14 is determined. This actual value of the nitrogen dioxide fraction is compared with a reference value for the nitrogen dioxide fraction. Depending on this comparison, at least one operating parameter for the motor 11 is changed such that the actual value of the nitrogen dioxide fraction in the exhaust gas upstream of the exhaust gas aftertreatment component 14 is brought closer to the reference value of the nitrogen dioxide fraction.

As stated earlier, the exhaust gas aftertreatment component 14 that is to be operated in an optimized manner through influencing the nitrogen dioxide fraction in the exhaust gas according to the invention can be a SCR catalytic converter. Alternatively, this exhaust gas aftertreatment component 14 can also be a particle filter or a NOx storage catalytic converter.

As stated earlier, the reference value for the nitrogen dioxide fraction in the exhaust gas is selected depending on the operating point. If the exhaust gas aftertreatment component 14 of the exhaust gas aftertreatment system 13 that is to be operated in an optimized manner as a result of the adjustment of the actual value of the nitrogen dioxide fraction is a SCR catalytic converter, then 50% is preferably selected as the reference value for the nitrogen dioxide fraction in the exhaust gas. However, it is also possible to select a reference value for the nitrogen dioxide fraction in the exhaust gas of less than 50%, particularly at high exhaust gas temperatures.

In particular, the reference value for the nitrogen dioxide fraction in the exhaust gas is selected such that the raw NOx emissions of the motor 11 are not reduced by more than 15% due to the operating parameter for the motor 11 that has been changed depending on this reference value. In this way, increased consumption can be prevented in the motor 11.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMERALS 10 internal combustion engine
11 motor
12 cylinder
13 exhaust gas aftertreatment system
14 exhaust gas aftertreatment component
15 sensor
16 characteristic line
17 characteristic line
18 characteristic line
19 characteristic line

The invention claimed is:

1. A method for operating an internal combustion engine having a motor, an exhaust gas aftertreatment system having an exhaust gas aftertreatment component, and a NOx sensor arranged downstream of the exhaust gas aftertreatment component, wherein exhaust gas formed in the motor during combustion of fuel is guided via the exhaust gas aftertreatment system for cleaning, the method comprising:
   measuring, by the NOx sensor, the NOx actual value as the exhaust gas actual value, the measurement being performed downstream of the exhaust gas aftertreatment component of the exhaust gas aftertreatment system;
   determining the actual value of the nitrogen dioxide fraction in the exhaust gas upstream of the exhaust gas aftertreatment component based on the exhaust gas actual value measured downstream of the exhaust gas aftertreatment component;
   comparing the determined actual value of the nitrogen dioxide fraction with a corresponding reference value for the nitrogen dioxide fraction; and
   changing at least one operating parameter for the motor depending upon the comparison such that the actual value of the nitrogen dioxide fraction is brought closer to the corresponding reference value for the nitrogen dioxide fraction,
   whereby the exhaust gas aftertreatment component operates in an optimized manner.

2. The method according to claim 1, wherein the reference value for the nitrogen dioxide fraction is selected as a function of a load point of the motor.

3. The method according to claim 1, wherein the reference value for the nitrogen dioxide fraction is determined based on at least one selected from the group of: at least one operating parameter of the motor and at least one operating parameter of the exhaust gas aftertreatment system.

4. The method according to claim 1, wherein at least one selected from the group of: a lambda value, an ignition time, valve control times, a motor compression, and an exhaust gas proportion in the motor combustion chamber is or are changed as operating parameter(s) for the motor.

5. The method according to claim 1, wherein the exhaust gas aftertreatment system has an SCR catalyst, the method further comprising, determining the exhaust gas actual value based on the actual value of the nitrogen dioxide fraction in the exhaust gas upstream of the SCR catalyst of the exhaust gas aftertreatment system.

6. The method according to claim 1, wherein the exhaust gas aftertreatment system has a particle filter, the method further comprising determining the exhaust gas actual value based on the actual value of the nitrogen dioxide fraction in the exhaust gas upstream of the particle filter of the exhaust gas aftertreatment system.

7. The method according to claim 1, wherein the exhaust gas aftertreatment system has a NOx storage catalyst, the method further comprising determining the exhaust gas actual value based on the actual value of the nitrogen dioxide fraction in the exhaust gas upstream of the NOx storage catalyst of the exhaust gas aftertreatment system.

8. The method according to claim 1, wherein the at least one operating parameter for the motor is changed such that raw NOx emissions of the motor are reduced by a maximum of 15%.

9. The method according to claim 1, wherein the motor of the internal combustion engine is a gas motor configured to burn gaseous and methane-containing fuel.

* * * * *